(12) United States Patent
Trif et al.

(10) Patent No.: US 11,799,176 B2
(45) Date of Patent: Oct. 24, 2023

(54) BATTERY SYSTEM

(71) Applicant: Robert Bosch GmbH, Stuttgart (DE)

(72) Inventors: Christian Trif, Kusterdingen (DE); Haris Alisic, Reutlingen (DE); Sara Fanzutti, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 63 days.

(21) Appl. No.: 17/370,659

(22) Filed: Jul. 8, 2021

(65) Prior Publication Data
US 2022/0021081 A1      Jan. 20, 2022

(30) Foreign Application Priority Data
Jul. 15, 2020   (DE) .................. 102020208836.5

(51) Int. Cl.
*H01M 50/507* (2021.01)
*H01M 50/522* (2021.01)
*H01M 50/213* (2021.01)

(52) U.S. Cl.
CPC ....... *H01M 50/507* (2021.01); *H01M 50/213* (2021.01); *H01M 50/522* (2021.01)

(58) Field of Classification Search
CPC . H01M 50/507; H01M 50/522; H01M 50/213
See application file for complete search history.

(56) References Cited

U.S. PATENT DOCUMENTS

| | | | |
|---|---|---|---|
| 2013/0337291 A1* | 12/2013 | Mayer ................ | H01M 50/502 429/7 |
| 2014/0234668 A1 | 8/2014 | Sweney et al. | |
| 2014/0255748 A1* | 9/2014 | Jan ....................... | H01M 10/04 429/158 |
| 2020/0067056 A1 | 2/2020 | Wynn et al. | |
| 2020/0168882 A1 | 5/2020 | Fees et al. | |
| 2021/0175586 A1* | 6/2021 | Haruki ................ | H01M 50/271 |

* cited by examiner

*Primary Examiner* — Jane J Rhee
(74) *Attorney, Agent, or Firm* — NORTON ROSE FULBRIGHT US LLP; Gerard Messina

(57) ABSTRACT

A battery system. The battery system includes a plurality of identically oriented battery cells, whose longitudinal axes are situated in parallel, a first busbar, and a second busbar. The first busbar and the second busbar are situated along the particular longitudinal axes on the same side of the battery cells, respective positive poles of the battery cells being connected to the first busbar with the aid of first bond connections, and respective negative poles of the battery cells being connected to the second busbar with the aid of second bond connections.

14 Claims, 2 Drawing Sheets

BATTERY SYSTEM

CROSS REFERENCE

The present application claims the benefit under 35 U.S.C. § 119 of German Patent Application No. DE 102020208836.5 filed on Jul. 15, 2020, which is expressly incorporated herein by reference in its entirety.

FIELD

The present invention relates to a battery system including bond connections for electrically contacting the battery cell.

BACKGROUND INFORMATION

Battery modules for use as energy stores in vehicles are frequently made up of a plurality of individual cells, for example lithium-ion cells. Electrical contacting takes place at the poles of the battery cell via contact elements, which are frequently connected to the battery cells with the aid of resistance welding methods. However, such resistance-welded connections are complex to manufacture and are restricted with respect to the material selection for the contact elements.

SUMMARY

The battery system according to an example embodiment of the present invention may offer the advantage over the related art of improved electrical contacting of battery cells, which enables rapid and simple installation, very good electrical properties, and low costs. In accordance with an example embodiment of the present invention, this may be achieved according to the present invention by a battery system including a plurality of battery cells, a first busbar, and a second busbar. Longitudinal axes of the battery cells are each situated in parallel to one another. Moreover, all battery cells are situated identically oriented, that means positive poles of the battery cells each point in the same direction with respect to the longitudinal axes. In particular, all battery cells are situated adjacent to one another, preferably at the same height, so that all positive poles are thus in a shared plane. The first busbar and the second busbar are situated on the same side of the battery cells with respect to the direction of the longitudinal axis. That means the two busbars, which are preferably designed in the form of metallic sheet plates, are not situated on opposite end faces of the battery cells, but are located on precisely one side of the battery cells. The two busbars are particularly preferably situated on a shared plane, which is perpendicular to the longitudinal axis, and is preferably essentially in a plane of the positive pole.

In accordance with an example embodiment of the present invention, the positive poles of the battery cells are connected to the first busbar with the aid of first bond connections. The negative poles of the battery cells are connected to the second busbar with the aid of second bond connections. A bond connection is considered to be an electrically conductive connection which includes a wire-like connecting element, the wire-like connecting element being bonded in each case to one of the busbars and to one of the poles of the battery cell. It is preferably an ultrasonic bond connection, which is manufactured with the aid of ultrasound. The bond connection is furthermore preferably a so-called ultrasonic wedge-wedge bond connection. The wire-like connecting element of the bond connection offers a certain resilience or flexibility, so that, for example, a reliable and permanent connection is ensured even in the event of vibrations or shocks acting on the battery system.

A further advantage results in that simple, cost-effective, and low-maintenance machine and facility technology may be used for assembling the battery system, thus for manufacturing the bond connections. Moreover, cost-effective materials having particularly good electrical properties, such as high conductivity, may be used for the bond connections.

Furthermore, the one-sided contacting of the battery cells has a particularly advantageous effect. On the one hand, in this way the manufacturing process may be kept very simple, cost-effective, and space-saving, since accessibility to the battery cells is only required from one direction. On the other hand, due to the arrangement of the busbars including the bond connections on only one side of the battery cells, a particularly compact structure of the battery system itself may be enabled, since contacting of the battery cells from both sides is not necessary, for example. In particular, complex handling and rotation of the battery cells during manufacturing is avoided by the one-sided contacting.

Preferred refinements of the present invention are disclosed herein.

The two busbars are preferably on the side of the battery cells on which the positive poles are located. Every second bond connection is connected to a shoulder area of the battery cell forming the negative pole, which encloses the respective positive pole. The second bond connection is preferably situated tangentially with respect to a circumference of the battery cell to obtain optimum utilization of the narrow shoulder area. In particular, the battery cell is considered to be constructed as follows for this purpose: each battery cell includes a single positive pole which is formed circular and is located only on precisely one end face of the battery cell. Moreover, each battery cell includes precisely one negative pole, which is formed in particular by a housing of the battery cell. The negative pole extends over the shoulder area which encloses the positive pole, a circumferential side, thus in particular a lateral area, of the battery cell, and an end face of the battery cell opposite to the positive pole. The shoulder area is in particular formed uninsulated in this case. For example, for this purpose an insulation may be removed on the shoulder area before the production of the second bond connection. Due to this arrangement, in addition to a compact geometry of the battery arrangement, a particularly simple manufacturability may be enabled. Since all components to be bonded are adjacent to one another and are accessible from the same direction, particularly simple handling of the system is possible during the manufacturing of the bond connections, in particular rotation of the battery cells not being required.

Each bond connection particularly preferably includes copper and/or aluminum. In particular, the wire-like connecting element of the bond connections is formed from copper and/or aluminum. Particularly cost-effective bond connections having optimum electrical properties, such as high conductivity, may thus be provided.

A thickness of each bond connection is preferably at least 100 μm, preferably at most 500 μm. A minimum and/or maximum dimension of the bond connection in a cross-sectional area of the bond connection is considered to be the thickness. For example, the thickness in a bond connection having circular cross-sectional area, thus in the case of a wire, corresponds to a diameter of the circular cross-sectional area. The bond connections are preferably so-called thick wire bond connections.

A cross-sectional area of each bond connection is particularly preferably designed in such a way that the bond connection is designed as a fuse. In this case, the fuse interrupts a current flow from and/or to the battery cell if a predefined maximum current is exceeded. In particular, a minimum cross-sectional area of each bond connection is considered. That means that if the predefined maximum current is exceeded, for example, because of a short-circuit in the battery system, each bond connection at which this maximum current is exceeded burns out, so that the electrical connection between battery cell and corresponding busbar is interrupted. The electrical contacting of the battery cells with the aid of the bond connections thus offers a particularly simple and cost-effective option for implementing an overcurrent protection device in the battery system.

The battery system preferably furthermore includes a cell holder, which includes one receptacle per battery cell. The receptacle is designed to hold precisely one battery cell in each case. The cell holder offers defined holding of the battery cells in relation to one another. Due to the special one-sided contacting of the battery cell with the aid of the bond connections, the cell holder may be designed in a particularly simple and cost-effective way, since minor requirements for the accessibility of the battery cells are necessary. The cell holder is preferably formed from an electrically nonconductive material, in particular plastic.

The cell holder preferably encloses each battery cell completely except for precisely one end face of the battery cell, in particular the end face at which the bond connections and the busbars, thus also the positive pole of the battery cell, are located. In other words, the cell holder encloses the entire circumference and precisely one end face of each battery cell completely. The receptacles of the cell holder are preferably formed like blind holes for this purpose, corresponding to a geometry of the battery cells. That means the battery cells may be inserted easily into the receptacles without further accessibility of the end face of the battery cell which is not to be contacted having to be ensured. The cell holder preferably has an integrally formed cell holder element, in which a plurality of receptacles is formed to accommodate the battery cells. The cell holder preferably additionally includes a cover, which is connectable to the cell holder element and which partially overlaps precisely one exposed end face each of the battery cells to secure the battery cells in the receptacles.

Furthermore, the cell holder preferably includes one wall per battery cell, which is situated between the positive pole and the negative pole. The wall forms a shield in the area between the first bond connection and the second bond connection. The wall is preferably part of a cover of the cell holder, which is removable and is designed to secure the battery cells in the receptacles. The wall has the effect that in the event of damage to the bond connection, a short-circuit of adjacent first and second bond connections is avoided. In particular, if a bond connection breaks off, the wall forms an electrically nonconductive barrier which prevents a bond remainder of the broken-off bond connection from being able to contact the closest bond connection.

A height of the wall is preferably designed in such a way that a minimum length of a virtual line which extends via the wall from the negative pole to the positive pole or vice versa is greater than a maximum bond length of each of the bond connections. A maximum dimension of the wall in the direction parallel to the longitudinal axes of the battery cells is considered to be the height. In the case of breaking off of the bond connection, in particular at one of the base points of the bond connection, the wall prevents a bond remainder from being able to contact the adjacent positive pole or negative pole or the adjacent bond connection.

Furthermore, a highest point of the wall with respect to the longitudinal axis is preferably situated higher above the particular battery cells than a highest point of each bond connection above the particular battery cell. That means the bond connections are always situated lower than the walls with respect to the longitudinal axis. The walls thus protrude beyond the bond connections in the direction parallel to the longitudinal axis and above the battery cells. A contact protection of the bond connections is thus enabled in a simple and cost-effective way. In particular, during transport or in the event of an impact or fall of the battery system, a probability of damage to the bond connections is thus reduced.

Furthermore, in accordance with an example embodiment of the present invention, the cell holder preferably includes two walls per bond connection, each bond connection being situated between the two walls. In particular, if each wall is taller than the highest point of each bond connection, in this way a particularly effective contact protection of the bond connections may be provided. For example, during the manual handling or during the transport of the battery system, it is thus made more difficult for objects to contact the bond connections and thus induce damage, a short-circuit, or the like.

The battery cells are preferably formed uninsulated. That means the battery cells do not have insulation which is located at least partially on an outer side of each battery cell for the contact protection. In particular, an insulating shrink tube is not provided on an outer side of the battery cell. In contrast, the insulation is preferably formed by the cell holder made of an electrically nonconductive material. Electrical contacting which is particularly simple to manufacture, in particular of the negative pole of the battery cell, may thus be enabled with the aid of the bond connections.

Each bond connection is preferably a wire bond connection or a ribbon bond connection. A bond connection with the aid of a wire which has a circular cross section is considered to be a wire bond connection. A bond connection with the aid of a ribbon which has a rectangular cross section is considered to be a ribbon bond connection.

The battery system particularly preferably includes multiple first busbars and/or multiple second busbars. A plurality of battery cells may thus be connected to one another in series and/or in parallel. In particular, both positive poles and negative poles may be connected to a first busbar. Similarly, both positive poles and negative poles may also be connected to a second busbar to enable, for example, a connection of multiple battery cells in series.

BRIEF DESCRIPTION OF THE DRAWINGS

Below, the present invention is described on the basis of an exemplary embodiment in conjunction with the figures. In the figures, functionally identical components are each identified by the same reference numerals.

DETAILED DESCRIPTION OF EXAMPLE EMBODIMENTS

Figure 1:
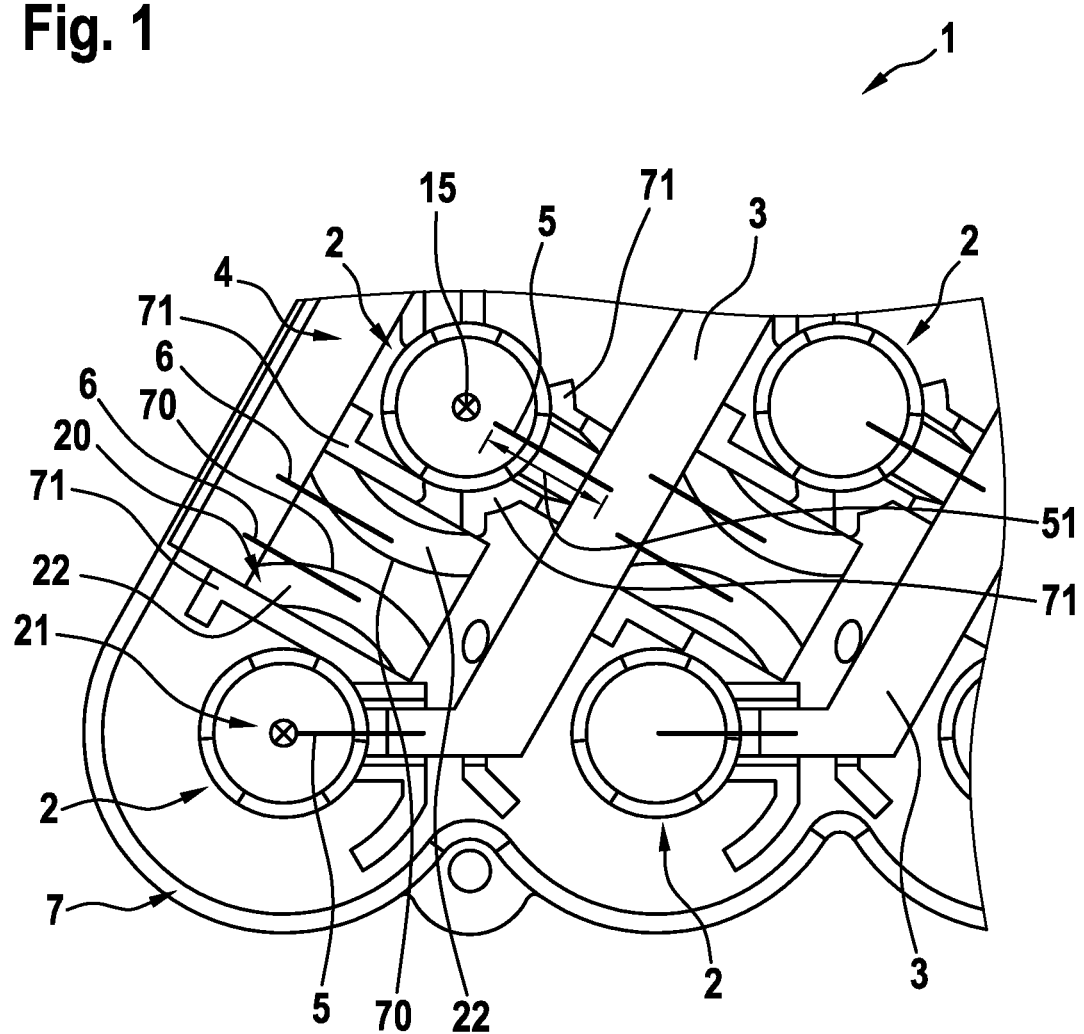
FIG. 1 shows a view of a battery system according to one preferred exemplary embodiment of the present invention.
Figure 2:
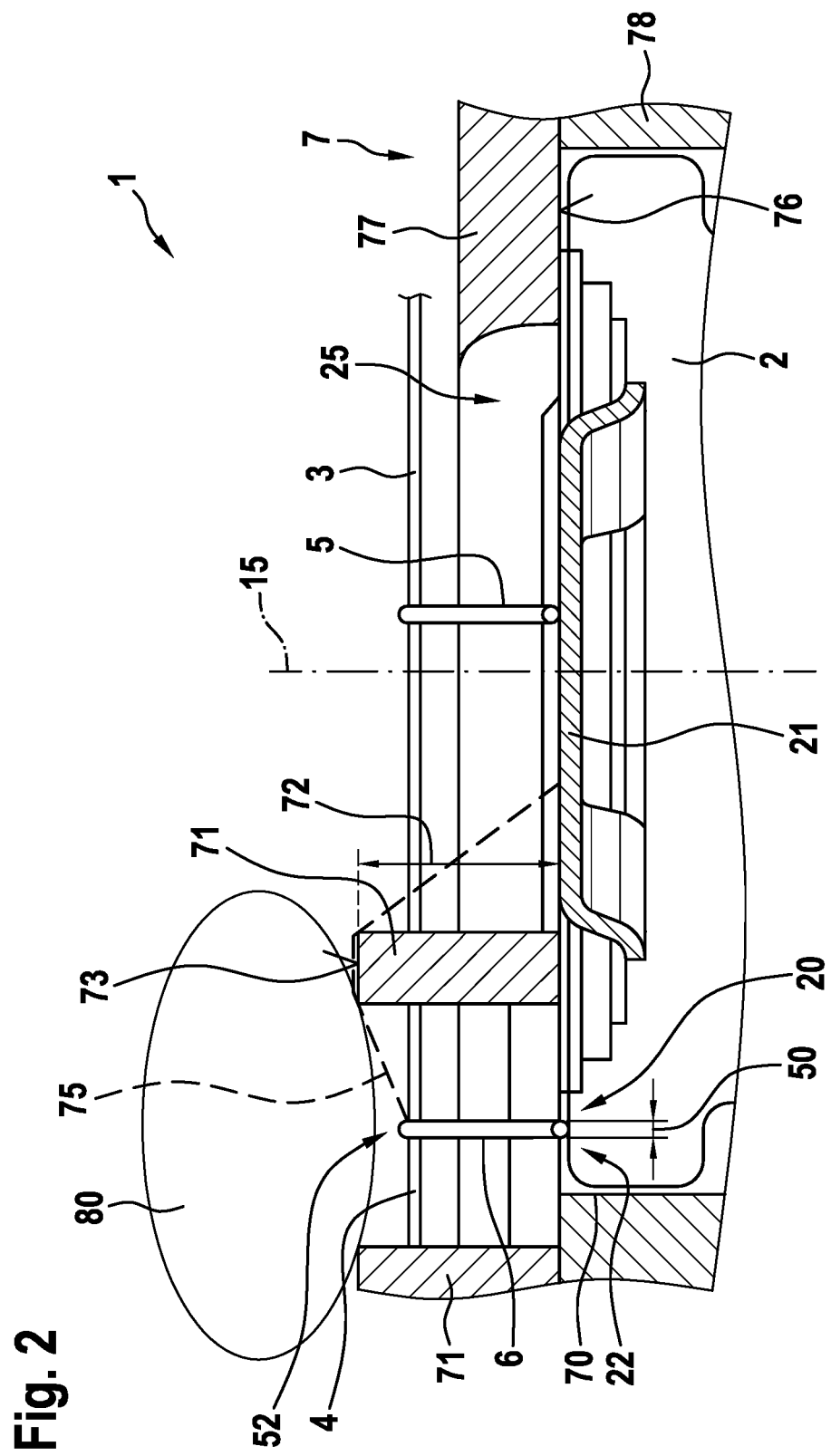
FIG. 2 shows a detail sectional view of the battery system of FIG. 1.

FIG. 1 shows a detail of a top view of a battery system 1 according to one preferred exemplary embodiment of the present invention. FIG. 2 shows a detail sectional view of battery system 1 of FIG. 1.

Battery system 1 includes multiple cylindrical battery cells 2 and a cell holder 7, which includes one receptacle 70 per battery cell 2, in which battery cell 2 is accommodated. Battery cells 2 are cylindrical battery cells 2. Longitudinal axes 15 of all battery cells 2 are situated in parallel. Moreover, all battery cells 2 are oriented identically, that means, positive poles 21 point in the same direction.

Each battery cell 2 includes one single positive pole, which is formed circular and is located only on precisely one end face of the battery cell (cf. FIG. 2). Moreover, each battery cell 2 includes precisely one single negative pole 22, which extends over a shoulder area 20 of battery cell 2, a lateral area, and an end face of battery cell 2 opposite to positive pole 21.

Cell holder 7 includes a cell holder element 78, in which battery cells 2 are situated in receptacles 70. Receptacles 70 are formed as cylindrical blind holes, only the end face at which positive pole 21 of battery cell 2 is located being exposed. Moreover, cell holder 7 includes a cover 77, which directly adjoins cell holder element 78 in the direction of longitudinal axis 15 and is connected thereto. Cover 77 overlaps the exposed end face of battery cell 2 including positive pole 21 and effectuates securing of battery cell 2 inside receptacle 70.

Moreover, battery system 1 includes a first busbar 3 and a second busbar 4, which are formed as sheet plates and include an electrically conductive material, for example copper or aluminum. The two busbars 3, 4 are situated on the same side of battery cells 2 with respect to longitudinal axes 15, namely on the side of positive poles 21. The two busbars 3, 4 are integrated into cover 77 of cell holder 7. As is apparent in FIG. 1, an array of battery cells 2 is situated between each two adjacent busbars 3, 4.

Busbars 3, 4 are each used to connect multiple battery cells 2 in parallel and in series and to transfer current from or to battery cells 2.

Particular positive poles 21 of battery cells 2 are connected with the aid of first bond connections 5 to first busbar 3. Moreover, particular negative poles 22 of battery cells 2 are connected with the aid of second bond connections 6 to second busbar 4.

First bond connections 5 and second bond connections 6 are each formed from aluminum.

Bond connections 5, 6 are wire bond connections which are characterized in that a wire having a circular cross section is bonded in each case with the aid of ultrasonic wedge-wedge bonding on the two contact partners, thus on one of busbars 3, 4 and on one of poles 21, 22.

First bond connections 5 are each bonded on the battery side centrally on positive pole 21. Second bond connections 6 are each bonded on the battery side on a shoulder area 20 of battery cell 2 forming negative pole 22. The bonded wire of second bond connections 6 extends tangentially with respect to cylindrical battery cells 2, as is apparent in FIG. 1.

The electrical contacting of battery cell 2 via bond connections 5, 6 and with the aid of busbars 3, 4 situated on one side offers numerous advantages. In particular, the one-sided arrangement and handling of all components contributing to the electrical contacting permits particularly simple assembly of the battery system 1, since all assembly steps may be carried out from precisely one side of battery system 1. Moreover, in this way a particularly compact geometry of battery system 1 is enabled, since space for accessibility is only required from the one direction.

Moreover, bond connections 5, 6 offer advantages during the operation of battery system 1. Thus, bond connections 5, 6 permit a certain compensation of relative movements of battery cells 2 and busbars 3, 4 in relation to one another, for example, because of different thermal expansions. Moreover, optimum electrical properties with respect to low transmission losses may be enabled by the use of aluminum as the material for bond connections 5, 6. Furthermore, bond connections 5, 6 may be manufactured particularly cost-effectively and easily, in particular due to the usability of the cost-effective aluminum and due to the cost-effective machine and facility elements which may be used to manufacture bond connections 5, 6.

Furthermore, bond connections 5, 6 enable implementation of an overcurrent protection device on battery system 1 in a simple and cost-effective manner. For this purpose, a minimal cross-sectional area of each bond connection 5, 6, thus a minimal diameter of each wire of bond connections 5, 6 is dimensioned in such a way that each bond connection 5, 6 is designed as a fuse. If a predefined maximum current which flows through bond connection 5, 6 is exceeded, it burns out automatically due to the corresponding dimensioning, so that a current flow via bond connection 5, 6 is interrupted. In particular, a diameter 50 of each bond connection 5, 6 is at least 100 µm and at most 500 µm, preferably 300 µm, for this purpose.

To offer mechanical protection of bond connections 5, 6 and thus a particularly durable battery system 1, cover 77 of cell holder 7 includes multiple walls 71, which each extend in parallel to longitudinal axes 15.

As is apparent in FIG. 2, a height 72, which is measured from a connection plane 76 between cover 77 and cell holder element 78, of each wall 71 is designed in such a way that a minimum length of an imaginary virtual line 75 which connects negative pole 22 and positive pole 21 to one another via wall 71, is greater than a maximum bond length 51 (see FIG. 1) of each of bond connections 5, 6. Each wall 71 thus offers a shield, so that if a bond connection 5, 6 breaks off, a wire piece is prevented from inadvertently being able to come into contact with an adjacent pole 21, 22. Short-circuits in the event of broken-off bond connections 5, 6 may thus be avoided.

Furthermore, height 72 of wall 71 is designed in such a way that a highest point 73 of wall 71 with respect to longitudinal axis 15 is taller than a highest point 52 of each bond connection 5, 6 above respective battery cell 2. A protection of bond connections 5, 6 from mechanical effects with the aid of objects is thus achieved to avoid damage to bond connections 5, 6, for example, during a transport of battery system 1. For example, as indicated in FIG. 2, larger objects 80 may thus be prevented from being able to contact bond connections 5, 6. In this way, a contact protection is implemented in particular to avoid inadvertent contacting of bond connections 5, 6 by a person. As is apparent in FIGS. 1 and 2, a wall 71 is advantageously located for this purpose in each case on both sides of each bond connection.

What is claimed is:

1. A battery system, comprising:
   a plurality of identically oriented battery cells, whose longitudinal axes are situated in parallel;
   a first busbar; and
   a second busbar, the first busbar and the second busbar being situated along the respective longitudinal axes on the same side of the battery cells, respective positive poles of the battery cells being connected to the first busbar using first bond connections, and respective negative poles of the battery cells being connected to the second busbar using second bond connections, wherein the first and second busbars are on a side of the battery cells on which the positive poles are located, and each of the first bond connections is connected centrally to the positive poles, and each of the second bond connections is connected to a shoulder area of the battery cell, which forms the negative pole and encloses the positive pole, wherein a bonded wire of the second bond connections extends tangentially with respect to the battery cell, wherein the cell holder includes one wall per battery cell of the battery cells, wherein the wall is configured to shield the positive pole and negative pole in an area between the first bond connection and the second bond connection.

2. The battery system as recited in claim 1, wherein each of the first and second bond connections includes copper and/or aluminum.

3. The battery system as recited in claim 1, wherein a thickness of each of the first and second bond connections is at least 100 µm, in particular at most 500 µm.

4. The battery system as recited in claim 3, wherein the thickness of each of the first and second bond connections is at most 500 µm.

5. The battery system as recited in claim 1, wherein a cross section of each of the first and second bond connections is configured in such a way that each of the first and second bond connections is a fuse which interrupts a current flow if a predefined maximum current is exceeded.

6. The battery system as recited in claim 1, further comprising:
   a cell holder which includes one receptacle per battery cell of the battery cells for holding the battery cell.

7. The battery system as recited in claim 6, wherein the cell holder encloses each battery cell of the battery cells completely except for precisely one end face of the battery cell.

8. The battery system as recited in claim 1, wherein a height of the wall is configured in such a way that a minimum length of a virtual line via the wall from the negative pole to the positive pole or vice versa is greater than a maximum bond length of each of the first and second bond connections.

9. The battery system as recited in claim 1, wherein a highest point of the wall with respect to the longitudinal axis is higher above the respective battery cell than a highest point of each first and second bond connection above the respective battery cell.

10. The battery system as recited in claim 1, wherein each first and second bond connection is situated between two walls.

11. The battery system as recited in claim 1, wherein the battery cells are formed uninsulated.

12. The battery system as recited in claim 1, wherein each of the first and second bond connections is a wire bond connection or a ribbon bond connection.

13. The battery system as recited in claim 1, including multiple first busbars and/or multiple second busbars for connecting a plurality of battery cells in series and/or in parallel.

14. A battery system, comprising:
   a plurality of identically oriented battery cells, whose longitudinal axes are situated in parallel;
   a first busbar; and
   a second busbar, the first busbar and the second busbar being situated along the respective longitudinal axes on the same side of the battery cells, respective positive poles of the battery cells being connected to the first busbar using first bond connections, and respective negative poles of the battery cells being connected to the second busbar using second bond connections,
   wherein the cell holder includes one wall per battery cell of the battery cells, wherein the wall is configured to shield the positive pole and negative pole in an area between the first bond connection and the second bond connection.

* * * * *